(12) United States Patent
Alapati et al.

(10) Patent No.: US 9,916,099 B2
(45) Date of Patent: *Mar. 13, 2018

(54) RESOURCE ALLOCATION FOR STAGED EXECUTION PIPELINING

(71) Applicant: Amazon Technologies, Inc., Seattle, WA (US)

(72) Inventors: Nishanth Alapati, Seattle, WA (US); Pradeep Vincent, Kenmore, WA (US); David Carl Salyers, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/161,117

(22) Filed: May 20, 2016

(65) Prior Publication Data

US 2016/0266816 A1    Sep. 15, 2016

Related U.S. Application Data (63) Continuation of application No. 14/017,203, filed on Sep. 3, 2013, now Pat. No. 9,348,602.

(51) Int. Cl.
| | |
|---|---|
| *G06F 9/00* | (2006.01) |
| *G06F 3/06* | (2006.01) |
| *H04L 29/06* | (2006.01) |
| *G06F 9/50* | (2006.01) |

(52) U.S. Cl.
CPC .............. *G06F 3/0611* (2013.01); *G06F 3/06* (2013.01); *G06F 3/067* (2013.01); *G06F 3/0631* (2013.01); *G06F 3/0653* (2013.01); *G06F 9/5083* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 6,885,376 | B2 | 4/2005 | Tang-Petersen et al. |
| 6,907,518 | B1 | 6/2005 | Lohman et al. |
| 6,931,640 | B2 * | 8/2005 | Asano ............... G06F 9/5011 711/153 |
| 7,812,846 | B2 | 10/2010 | Bakalash et al. |
| 7,940,261 | B2 | 5/2011 | Wei et al. |
| 8,126,318 | B2 | 2/2012 | Nonaka et al. |
| 8,438,578 | B2 | 5/2013 | Hoover et al. |
| 8,522,251 | B2 | 8/2013 | Rao et al. |
| 8,629,877 | B2 | 1/2014 | Bakalash et al. |
| 8,724,624 | B2 | 5/2014 | Bazlamacci et al. |
| 8,898,396 | B2 | 11/2014 | Mejdrich et al. |
| 8,954,587 | B2 | 2/2015 | Gusak |
| 9,088,577 | B2 | 7/2015 | Zhu et al. |
| 2008/0298372 | A1 | 12/2008 | Basso et al. |
| 2011/0161965 | A1 | 6/2011 | Im et al. |
| 2013/0227573 | A1 | 8/2013 | Morsi et al. |

(Continued)

*Primary Examiner* — Cheng-Yuan Tseng (74) *Attorney, Agent, or Firm* — Davis Wright Tremaine LLP (57) ABSTRACT

A method and apparatus for staged execution pipelining and allocating resource to staged execution pipelines are provided. One or more execution pipelines are established, where each of the one or more execution pipelines includes one or more execution stages. Data is provided to the one or more execution pipelines for processing and resources are allocated to the execution pipeline.

20 Claims, 7 Drawing Sheets

(56) References Cited

U.S. PATENT DOCUMENTS

2014/0281385 A1    9/2014   Tu
2014/0310418 A1   10/2014   Sorenson et al.
2015/0074677 A1    3/2015   Pream et al.

* cited by examiner

RESOURCE ALLOCATION FOR STAGED EXECUTION PIPELINING

CROSS REFERENCE TO RELATED APPLICATIONS

This application is a continuation of U.S. application Ser. No. 14/017,203, filed Sep. 3, 2013, entitled "RESOURCE ALLOCATION FOR STAGED EXECUTION PIPELINING."

BACKGROUND

The use of remote program execution and storage services has proliferated in recent years. The resources for remote program execution and storage are often provided by computing resource providers who leverage large-scale networks of computers, servers and storage drives to enable clients, including content providers, online merchants and the like, to host and execute a variety of applications and web services. The content providers and online merchants, who traditionally used on-site servers and storage equipment to host their websites and store and stream content to their customers, often forego on-site hosting and storage and turn to using the resources of the computing resource providers. Remote program execution and storage services allow content providers and online merchants, among others, to efficiently and adaptively satisfy their computing needs, whereby the computing and storage resources used by the content providers and online merchants are added or removed from a large pool provided by a computing resource provider as needed.

It is important for the users of remote storage services to be able to efficiently and timely upload their data to storage volumes in the remote storage service. Further, it is also important that data processing and uploading not overwhelm the computing resources of the computing devices of the users.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include determining a number of staged execution pipelines that are used for performing data processing operations. Each staged execution pipeline may comprise one or more execution stages, whereby each of the execution stages may be dedicated or configured to perform a type of processing operation. The number of execution stages of each staged execution pipeline and the computing resources required by the execution stages may vary depending on the pipeline. The number of staged execution pipelines may be determined based at least in part on available computing resources or measurements of the utilization of the available computing resources. The available computing resources may include CPU thread or core count, local storage capacity, local storage input/output bandwidth and network bandwidth. The utilized computing resources may include CPU utilization, local storage utilization, local storage input/output consumption or network bandwidth utilization.

Resources may be allocated to each staged execution pipeline and each execution stage. The amount of computing resources allocated to each stated execution pipeline may also be based at least in part on available computing resources or measurements of computing resource utilization. Data may be submitted to each staged execution pipeline for processing, whereby a limit or a bound may be placed on the size or length of the data that is submitted to each staged execution pipeline for processing. Further, the data that is submitted to the staged execution pipelines may be retrieved from a data array, which may be a buffer or a first in, first out (FIFO) queue. The data that is submitted to the staged execution pipelines may be processed at each execution stage of the pipeline and may be queued between the execution stages. Following processing, the data may be transmitted over a network for storage.

In network-enabled storage, a user or a customer of a network storage service may utilize network storage resources to store their data. Network storage resources may be a series or a fleet of storage devices, such as hard disks, solid-state drives or recording tapes, that are connected via a network to one another and accessible to the user via a network, such as the Internet, an intranet or an Internet service provider (ISP) network. The network storage resources maybe utilized for object-based storage, where data objects, such as computer-readable or computer-executable files, of flexible sizes may be read from and written to a network storage resource. Further, storage resources may be used for block storage, where blocks of data of a given length, size or volume may be read from and written to a network storage resource.

Because network storage resources may not local to a user or a user device and may not be directly accessible via a local connection or a local bus, network storage resource may be exposed and linked to the user using a storage networking protocol, such as Internet Small Computer System Interface (iSCSI). A storage networking protocol enables reading, writing and managing data that is network-attached and gives the user the illusion of local or attached storage.

Network-based storage devices may completely replace local storage. A subscriber using the network storage may execute applications using virtual computing or on-site physical computing devices and may exclusively use network storage for storing data. Alternatively, network storage may compliment on-premise storage devices or attached storage devices, whereby computing devices may have both a locally attached storage device and a network-attached network storage device. The locally attached storage device may be used to store recently or frequently accessed data, whereas the network storage device may be used to store the entirety of the user's data (i.e., including data that stored in the local storage devices). By way of example, a user may have 10 terabytes (TB) of data that is network-stored, while only 1 TB of the 10 TBs is locally stored. The latter configuration is advantageous as data may be more readily retrieved from the local storage than the network storage. In one use case, bandwidth resources may be scarce and where may be an upload or download latency associated with supplying or obtaining data from network storage. Data that is written to storage may be initially written to local storage but may experience delay as it is uploaded to network storage. Similarly, when the data is read, it may be initially requested from local storage rather than incurring the network delay associated with obtaining the data from network storage.

Before data is carried over a network to be stored in network storage, the data may be processed and operated upon to ensure that the data will be received without error and that the data's security is not breached. Examples of processing that may be performed on the data include encryption, coding, hashing, checksumming and compression. To ensure data security, the data may be encrypted using an encryption key. Further, the data may be coded, hashed or checksummed to add redundancy to the data to counteract network-induced error and ensure error-free reception of the data. In addition, compression may be used to reduce the size of the data by exploiting patterns in the data. Processing the data may be computationally intensive and may strain the computing resources of user processors and computing equipment. Further, data processing may contend for resources with other operations, such as, read and write operations to local storage or transmission of the data over to network storage.

Pipelining may be used to facilitate data processing, whereby a pipeline may include one thread of active execution data and the processing of data in one pipeline may be separate and independent of the processing in another pipeline. Further, the computing resources allocated to for the execution of data in one to a pipeline may also be separate and independent of the computing resources allocated for the processing of data in another pipeline. Although, operated on separately, data in two or more pipelines may require similar processing as one another and the operations performed on the data of each pipeline may be the same. The number of pipelines or active execution threads that are executed at one time may be determined based at least in part on the available computing resources, current resource usage or available network bandwidth, among others. Further, the computing resources that are allocated to each pipeline may be determined based at least in part on the available computing resources, current resource usage or available network bandwidth, among others.

Each pipeline may be divided into a plurality of stages of execution, whereby each stage of execution may be a type of operation performed in the pipeline. For example, if data to be uploaded to network storage enters a pipeline, a first stage of the pipeline may be data compression and a final stage in the pipeline may be data encryption. The computing resources allocated to each stage in a pipeline may be done to improve overall throughput and may be based at least in part on current resource utilization and input/output latency, among others.

Figure 1:
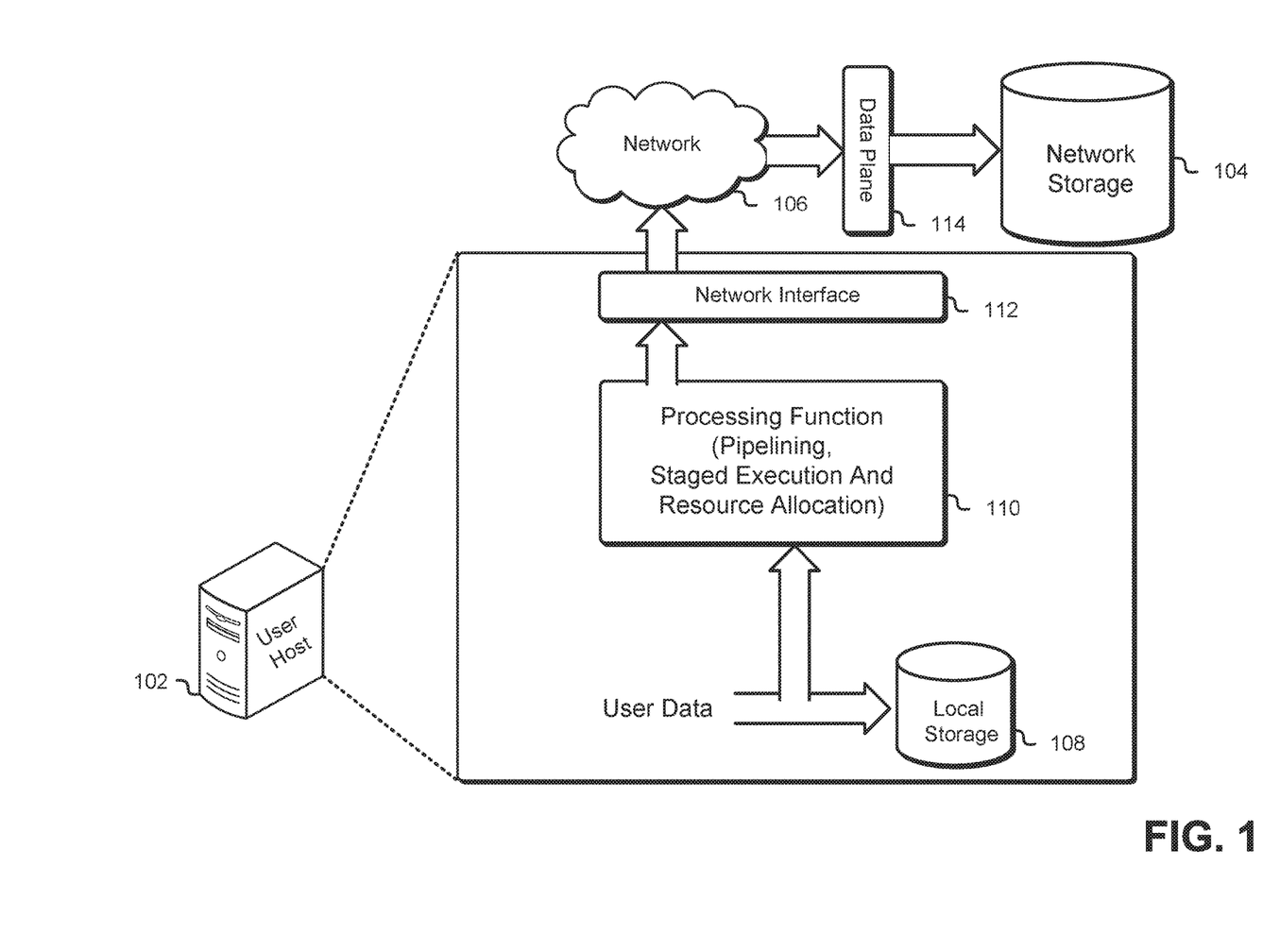
FIG. 1 shows an example of pipelining and staged execution.

FIG. 1 shows an example of pipelining and staged execution. A user host 102 utilizes network storage 104 for storing data. The user host 102 may access network storage 104 via a network 106, which may, for example, be the Internet. The user host 102 may be any computer or server that is capable of performing data processing and manipulation operations. The user host 102 may utilize any processor, such as a central processing unit (CPU), graphics processing unit (GPU) or digital signal processor (DSP), among others. When equipped with a CPU, the user host may have any number of processing cores that facilitate symmetric multi-processing. Further, the user host 102 may be equipped with memory, such as dynamic or static random access memory (RAM), input and output devices or ports and a power adapter or power source.

During the course of operation, the user host 102 may read data from or write data to storage. A user associated with the user host 102 may be a customer of a storage service provider and may rent storage resources from the storage service provider. The network storage 104 may be made available to the user host 102 by the storage resource provider. Access to the network storage 104 may be facilitated by a data plane 114. The data plane may comprise an inbound interface that determines a destination or a path for received data. The data plane may cause data received from the user host 102 to be sent to the network storage 104. The network storage 104 may be one or more physical storage devices as described herein or may be one or more logical storage volumes that are based upon the virtualization of one or more underlying physical storage volumes. The user host 102 may read data from or write data to the network storage 104 using a protocol, such as iSCSI, whereby each storage volume, whether physical or virtual, of the network storage 104 is uniquely identifiable. In addition, the user host 102 may be equipped with local storage 108, which may be a hard disk or solid-state drive, among others. The local storage 108 may be used to locally retain a portion or all of the user host's data.

The local storage 108 is advantageous because data that is written to the network storage 104 may be more readily stored in the local storage 108 (and available for access, if needed) than the network storage. Data may be more readily stored in the local storage 108 than the network storage because the data may require time-consuming and computationally intensive operations before it may be sent via the network 106 to the network storage 104. Additionally, the local storage 108 may be utilized as a cache that exploits temporal and location-based patterns in data access. As a local cache, the local storage 108 may be used to store recently or frequently accessed data and provide the data for use more readily than the network storage 104, which is subject to network delay.

As described herein, before the data is sent to the network storage 108, the data may be processed and operated upon. The processing may include calculating a checksum for the data for detecting errors introduced in transmission or storage. The processing may also include performing data compression to reduce the size of the data and performing encryption to protect the data from eavesdropping. Further, after performing the required processing, the data may be placed in a queue for sending or transmission over the network 106 to the storage network 104.

The user host 102 is equipped with a processing function 110 that determines a number of execution pipelines to be used and allocates data to the execution pipelines. An execution pipeline may be an active execution thread in which data is operated upon. Each execution pipeline may be divided into a number of execution stages, whereby each stage may represent a type of processing that is performed on the data and data that is outputted from one execution stage may be queued and serve as an input to another execution stage of the pipeline. The processing function 110 also allocates resources to both the pipelines and the execution stages of the pipeline. The processing function 110 may allocate resources to the execution pipelines based at least in part on a number of constraints, such as available or used processing power, available upload bandwidth, network utilization or CPU thread count. Resource allocation may be performed to optimize throughput, whereby, for example, resources may be diverted between pipelines or between execution stages to ensure that optimum data throughput is realized. By way of example, when data is queue in an input/output queue for transmission over the network 106, the processing function 110 may reallocate resources from the encryption stage of a pipeline to the input/output queue to ensure that the input/output queue received the necessary computing resources to perform data upload. After the data upload is perform, the computing resources may be directed back to complete the encryption.

The user host 102 is also equipped with a network interface 112 through which the host may exchange data with the network storage 104. The transmission and reception of data using the network interface may be subject to available bandwidth on the network. Due to the bandwidth constraint, the network interface 112 may be equipped with a queue in which data awaiting upload or transmission is stored.

Figure 2:
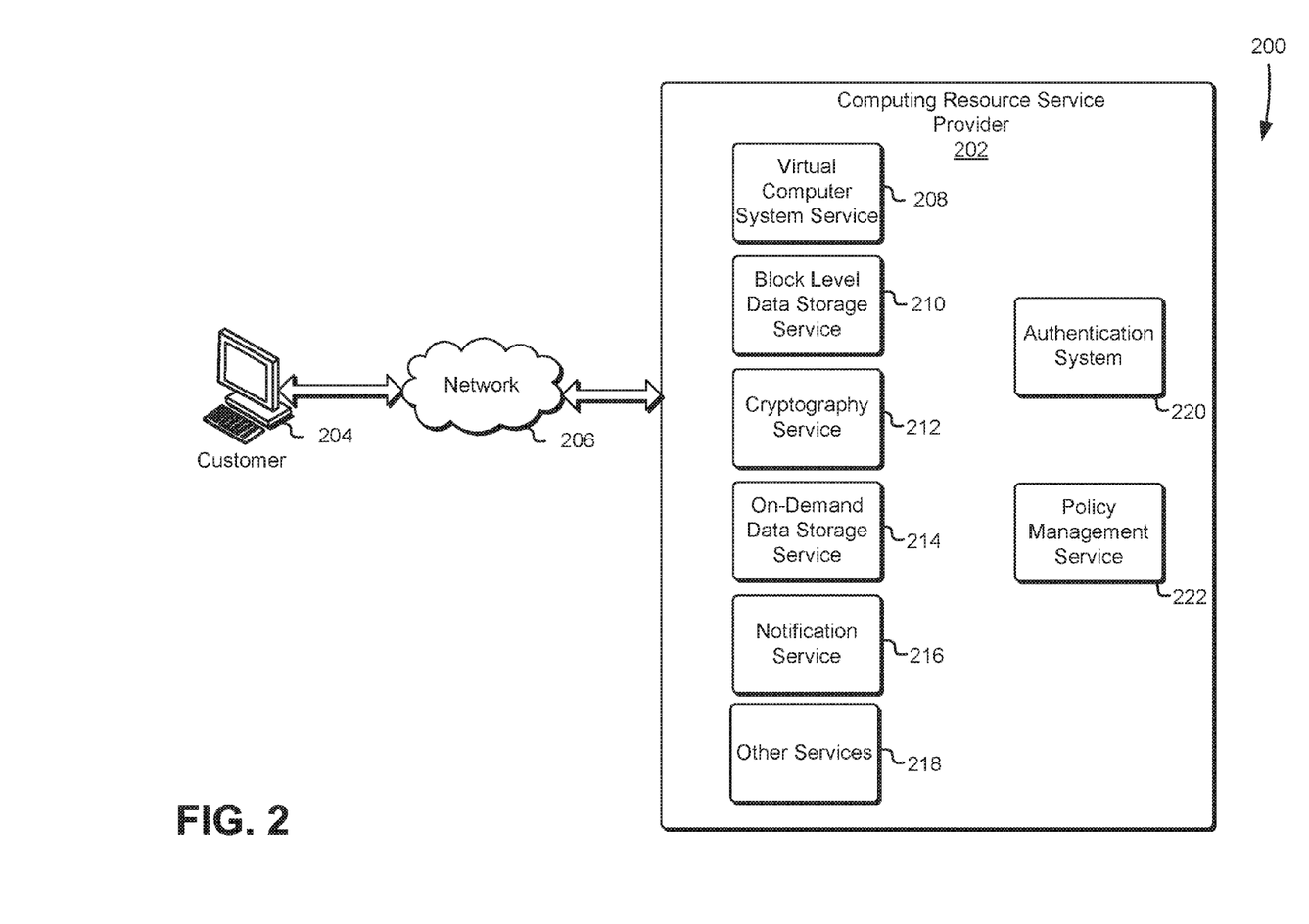
FIG. 2 shows an example of a customer connected to a computing resource service provider.

FIG. 2 shows an example of a customer connected to a computing resource service provider. The computing resource service provider 202 may provide a variety of services to a customer 204. The customer 204 may be an organization that may utilize one or more of the services provided by the computing resource service provider 202 to maintain and deliver information to its employees, which may be located in various geographical locations. Additionally, the customer 204 may be an individual that utilizes the services of the computing resource service provider 202 to deliver content to a working group located remotely. As shown in FIG. 2, the customer 204 may communicate with the computing resource service provider 202 through a network 206, whereby the network may be a communication network, such the Internet, an intranet or an Internet service provider (ISP) network. Some communications from the customer 204 to the computing resource service provider 202 may cause the computing resource service provider 202 to operate in accordance with one or more embodiment described herein or a variation thereof.

The computing resource service provider 202 may provide various computing resource services to its customers. The services provided by the computing resource service provider 202, in this example, include a virtual computer system service 208, a block-level data storage service 210, a cryptography service 212, an on-demand data storage service 214 and one or more other services 218. It is noted that not all embodiments described herein include the services 208-218 of the computing resource service provider 202 and additional services may be provided in addition to or as an alternative to services explicitly described herein. Each of the services may include one or more web service interfaces that enable the customer 204 to submit appropriately configured API calls to the various services through web service requests. In addition, each of the services may include one or more service interfaces that enable the services to access each other (e.g., to enable a virtual computer system of the virtual computer system service 208 to store data in or retrieve data from the on-demand data storage service 214 and/or to access one or more block-level data storage devices provided by the block level data storage service 210).

The virtual computer system service 208 may be a collection of computing resources configured to instantiate virtual machine instances onto virtual computing systems on behalf of the customers 204 of the computing resource service provider 202. Customers 204 of the computing resource service provider 202 may interact with the virtual computer systems' service (via appropriately configured and authenticated API calls) to provision and operate virtual computer systems that are instantiated on physical computing devices hosted and operated by the computing resource service provider 202. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 208 is shown in FIG. 2, any other computer system or computer system service may be utilized in the computing resource service provider 202, such as a computer system or computer system service that does not employ virtualization or instantiation and instead provisions computing resources on dedicated or shared computers/servers and/or other physical devices.

The block-level data storage service 210 may comprise one or more computing resources that collectively operate to store data for a customer 204 using block-level storage devices (and/or virtualizations thereof). The block-level storage devices of the block-level data storage service 210 may, for instance, be operationally attached to virtual computer systems provided by the virtual computer system service 208 to serve as logical units (e.g., virtual drives) for the computer systems. A block-level storage device may enable the persistent storage of data used/generated by a corresponding virtual computer system where the virtual computer system service 208 may only provide ephemeral data storage.

The computing resource service provider 202 may also include an on-demand data storage service 214. The on-demand data storage service 214 may be a collection of computing resources configured to synchronously process requests to store and/or access data. The on-demand data storage service 214 may operate using computing resources (e.g., databases) that enable the on-demand data storage service 214 to locate and retrieve data quickly, so as to allow data to be provided in responses to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service 214 may be organized into data objects. The data objects may have arbitrary sizes except, perhaps, for certain constraints on size. Thus, the on-demand data storage service 214 may store numerous data objects of varying sizes. The on-demand data storage service 214 may operate as a key value store that associates data objects with identifiers of the data objects which may be used by the customer 204 to retrieve or perform other operations in connection with the data objects stored by the on-demand data storage service 214. The on-demand data storage service 214 may also be accessible to the cryptography service 212. For instance, in some embodiments, the cryptography service utilizes the on-demand data storage service to store keys of the customers in encrypted form, where keys usable to decrypt the customer keys are accessible only to particular devices of the cryptography service 212. Access to the data storage service by a customer, another service, or other entity may be through appropriately configured API calls.

In the environment illustrated in FIG. 2, a notification service 216 is included. The notification service 216 may comprise a collection of computing resources collectively configured to provide a web service or other interface and browser-based management console that can be used to create topics customers want to notify applications (or people) about, subscribe clients to these topics, publish messages, and have these messages delivered over clients' protocol of choice (i.e., HTTP, email, SMS, etc.). The notification service may provide notifications to clients using a "push" mechanism without the need to periodically check or "poll" for new information and updates. The notification service may be used for various purposes such as monitoring applications executing in the virtual computer system service, workflow systems, time-sensitive information updates, mobile applications, and many others.

The computing resource service provider 202 may additionally maintain one or more other services 218 based at least in part on the needs of its customers 204. For instance, the computing resource service provider 202 may maintain a database service for its customers 204. A database service may be a collection of computing resources that collectively operate to run one or more databases for one or more customers 204. Customers 204 of the computing resource service provider 202 may operate and manage a database from the database service by utilizing appropriately configured API calls. This, in turn, may allow a customer 204 to maintain and potentially scale the operations in the database. Other services include, but are not limited to, object-level archival data storage services, services that manage and/or monitor other services and/or other services.

As illustrated in FIG. 2, the computing resource service provider 202, in various embodiments, includes an authentication system 220 and a policy management service 222. The authentication system, in an embodiment, is a computer system (i.e., collection of computing resources) configured to perform operations involved in authentication of users of the customer. For instance, one of the services may provide information from the users to the authentication service to receive information in return that indicates whether or not the user requests are authentic.

The policy management service 222, in an embodiment, is a computer system configured to manage policies on behalf of customers of the computing resource service provider. The policy management service 222 may include an interface that enables customers to submit requests related to the management of policy. Such requests may, for instance, be requests to add, delete, change or otherwise modify policy for the customer or for other administrative actions, such as providing an inventory of existing policies and the like. Other services and/or components may also be included in the environment 200. Similarly, techniques of the present disclosure apply to other environments.

Figure 3:
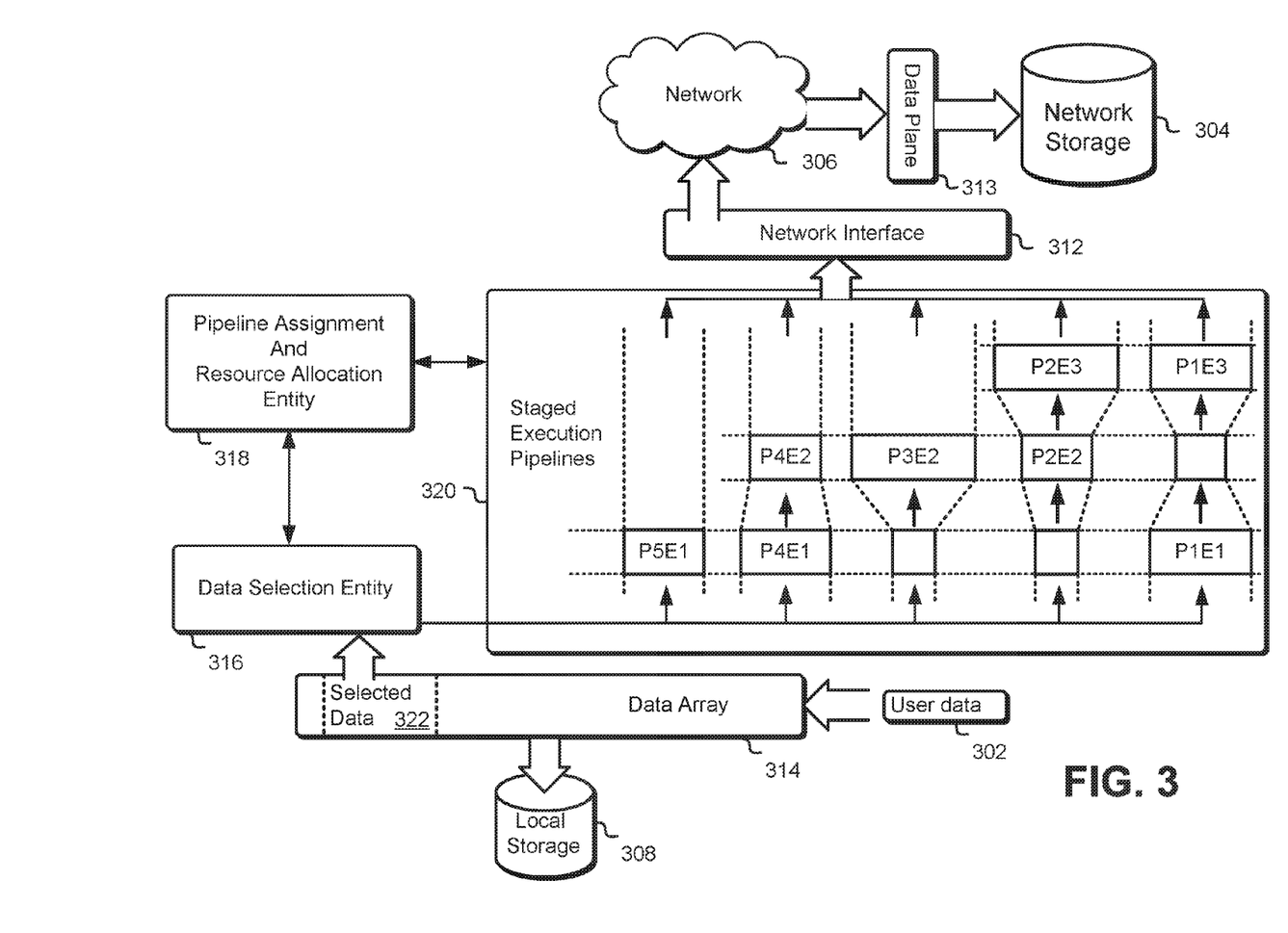
FIG. 3 shows an example of resource allocation and pipeline assignment.

FIG. 3 shows an example of resource allocation and pipeline assignment. User data 302, which may be any data that is sought to be operated on or processed, is provided to a data array 314. The data array 314 may be any type of buffer that is configured to receive and store data that is awaiting retrieval or processing. Examples of the data array 314 include a or first in, first out (FIFO) queue among others.

The data array 314 may be implemented using any type of memory device, such as a statistic or dynamic RAM. The user data 314 may be stored in the data array 314 pending processing and upload to the network storage 304.

Due to the latency associated with sending the user data 302 to the network storage 304, the user data 302 is retrieved from the data array 314 and stored in local storage 308. The local storage 308 facilitates access to the data while the data is being provided to the network storage 304. Further, in cases where a replicate copy of requested data is stored in the local storage 308, the presence of the data in the local storage 308 enables the data to be more readily available for retrieval than its counterpart that is stored in the network storage 304.

As described herein, before the user data 302 is sent over the network 306 to the network storage 304, the user data 302 is processed. Access to the network storage 304 may be facilitated by a data plane 313. The data plane may be an inbound interface that determines a destination or a path for received data. The user data 302 may, for example, be coded, compressed or encrypted and a checksum or hashing operation may be performed on the user data 302. As may be recognized, the operations performed on the data may be computationally-intensive and may require much of the resources of an underlying processor, such as a single- or multi-core CPU. Further, the operations may consume network resources and memory or storage I/O bandwidth.

A data selection entity 316, which may be implemented as a computer system or component thereof, such as a programming module comprising computer-executable instructions, selects data 322 for processing from the data array 314. The data 322 may be selected based at least in part on the type of processing or type of operations to be performed on the data or the time at which the data entered the data array 314. Further, the data 322 may be selected based at least in part on the available processing resources as determined by a pipeline assignment and resource allocation entity 318. The selected data 322 may have been stored in the data array 314 at any point and may not be the earliest received by the data array. Further, the selected data 322 may not be contiguous and may comprise portions of a plurality of data objects or data blocks. The selected data 322 may also be pre-processed to optimize resource utilization, whereby, for example, a write operation to a particular memory location in network storage 304 may be obviated by subsequent write operations to the same memory location.

The data selection entity 316 then provides the data to the staged execution pipelines 320 for processing. The pipeline assignment and resource allocation entity 318 determines the number of execution pipelines that are active any point in time. The pipeline assignment and resource allocation entity 318 may determine the number of execution pipelines based at least in part on one or more measurements of available or utilized resources. The available or utilized resources include processing utilization, for example, CPU utilization of an underlying processor, network throughput available, available local storage, or local storage input/output consumption. The pipeline assignment and resource allocation entity 318 may also determine the number of execution pipelines based at least in part on computing resources, such as underlying computational resources including CPU core count and CPU thread count.

In addition to determining the number of execution pipelines, the pipeline assignment and resource allocation entity 318 also determines the number of tasks that are to be submitted to each pipeline for execution. The number of tasks submitted to each pipeline may be static and may be dynamically adjusted, for example, based at least in part on changes to the available or utilized resources or the underlying computing resources. Upon determining the number of execution pipelines or the number task to be submitted to each execution pipeline, the pipeline assignment and resource allocation entity 318 communicates the numbers to the data selection entity 316 and the data selection entity provides data for processing to the staged execution pipelines 320.

The staged execution pipelines 320 may include one or more active execution pipelines. As shown in FIG. 3, five staged execution pipelines are used for processing user data 302. Each staged execution pipeline may comprise one or more execution stages. The data execution stages of one pipeline may be the same or different than the data execution stages of another pipeline. A data execution stage represents the type of processing performed on data that is processed in the pipeline. Each of compression, coding or encryption may be a data execution stage, for example. As shown in FIG. 3, the first and second pipeline have the same data execution stages, whereas the third and fourth pipelines have data execution stages that are the same as one another but different than the data execution stages of the first and second pipelines. The pipeline assignment and resource allocation entity 318 allocates processing and computing resources to each execution stage of the execution pipelines in a manner that optimizes resource utilization and throughput and minimizes latency. An execution stage of the pipeline may be computationally intensive and the pipeline assignment and resource allocation entity 318 may assign computing resources to the execution stage in a manner that does not deprive other less computationally intensive execution stages from the computing resources. Similarly, an execution stage of the pipeline may be input/output intensive or may heavily utilize network bandwidth resources. The pipeline assignment and resource allocation entity 318 may assign network bandwidth resources to the execution stage while reserving network resources for usage other execution stages. Accordingly, when the network resources are scarce, the execution stages requiring fewer network resources may be allocated resources to timely execute their assigned tasks.

The pipeline assignment and resource allocation entity 318 may increase resource allocation to one stage of the execution pipeline and decrease resource allocation to another based at least in part on the available or utilized resource and the desired overall performance of the staged execution processing. As shown in FIG. 3, more resources are allocated to the third execution stage of the second execution pipeline than to the second execution stage as illustrated by a wider rectangle representing the third execution stage than the second execution stage. It is noted that the width of the rectangle representing the resources allocated to an execution stage is shown for illustration and ease of description. The allocation of resources to each execution stage may vary depending on the type of resource. As described herein, computing resources include CPU power, network bandwidth and memory resources, among others. An execution stage may, for example, be allocated double the network bandwidth of another execution stage but half the CPU power or memory resources. The allocation of a type of resource to an execution stage may be constrained by the availability of the resource and whether it is preferable to allocate the resource is other another execution stage. It may be preferable to allocate the resource to another execution stage if allocating the resource to the other execution stage results in higher throughput or lower network latency.

Although five pipelines are shown in FIG. 3, the staged execution pipelines 320 may include any number of pipelines. The stage execution pipelines 320 may further include idle pipelines for which no resources are allocated at a given moment in time but for which resource may be allocated at a later time. Resources may be allocated to an execution stage of an idle pipeline if allocating the resources results in higher overall throughput and lower latency. The allocation of resources to an execution stage may be affected by or based on the computing resource needed by another execution stage.

After data is processed in the staged execution pipelines 320, the data is provided to a network interface 312 to be sent to the network storage 304 via the network 306. Network bandwidth may be constrained and the data may be buffered or may wait in the network interface 312 before being sent to the network storage 304. Accordingly, the network interface 312 may be an idle-intensive portion of data processing. Contrary to other systems, where resources that are dedicated to an idle-intensive stage are unused when the stage is idle, in the embodiments described herein, the pipeline assignment and resource allocation entity 318 reallocates computing resource so as to ensure that idle-intensive stages of execution do not deprive computationally-intensive stages of computing resources.

Figure 4:
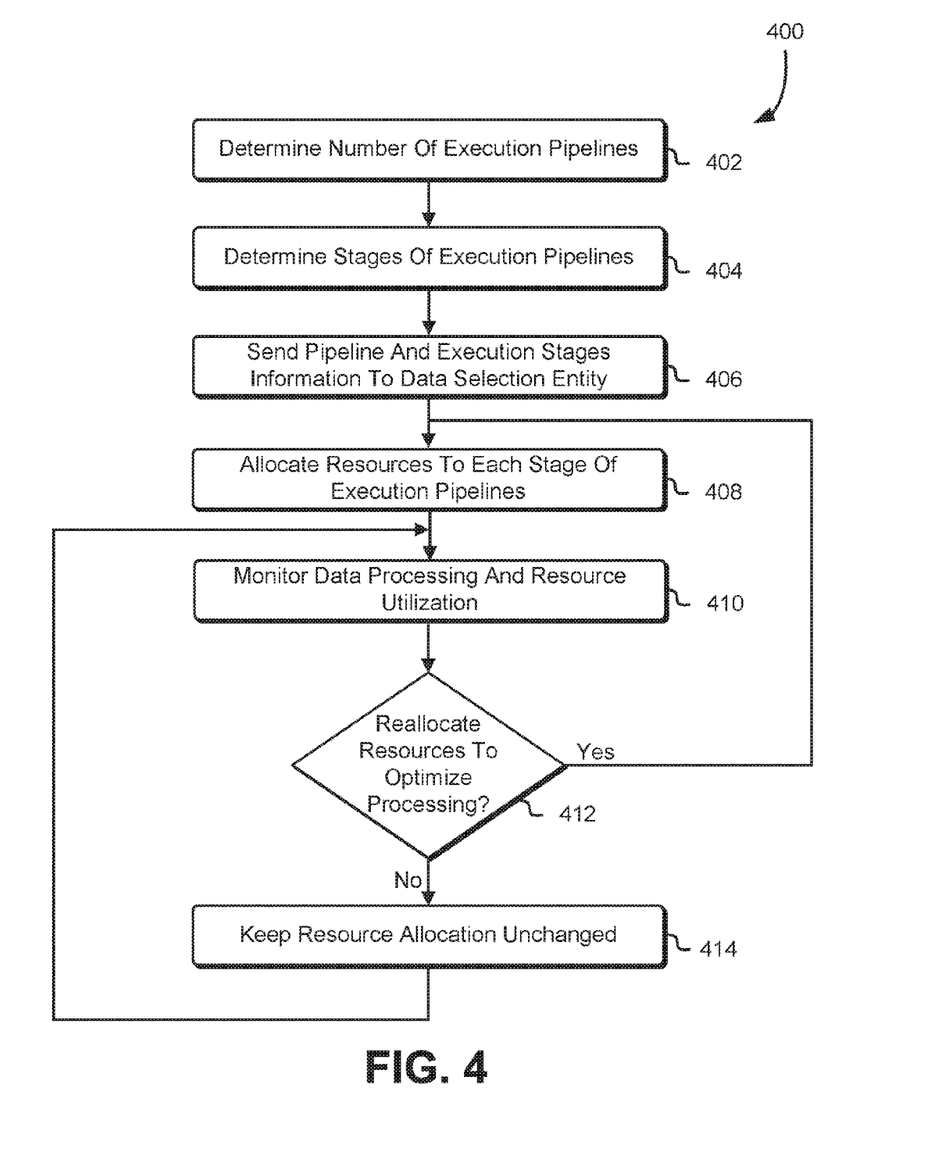
FIG. 4 shows an example of a method for allocating resources for staged execution pipelines.

FIG. 4 shows an example of a method for allocating resources for staged execution pipelines. In the process 400, a pipeline assignment and resource allocation entity 318 determines 402 the number of execution pipelines to be used for processing data. The number of execution pipelines may be proportional to the bandwidth by which data may be sent over a network, such as network 306 described with reference to FIG. 3. Further, the number of execution pipelines may also be proportional to computational or network resources, such as the number of CPU cores or threads of an underlying hardware, and inversely proportional to the utilization of the computational or network resources.

The pipeline assignment and resource allocation entity 318, which may be implemented as a computer system or component thereof, such as a programming module configured with executable instructions, also determines 404 the stages of the execution pipelines. Each execution pipeline may comprise a number of execution stages and each execution stage may be tasked with or may be responsible for executing one or more types of operations, such as performing a checksum calculation, hashing, compression or encryption, among others. Data that is submitted from one execution stage to another within a pipeline may queued using or subject to any queuing mechanism. Determining the stages of each execution pipeline may be based at least in part on the data that is held in a data array, such as data array 314 described with reference to FIG. 3, and the type of processing that is sought to be performed on the data. Further, the stages of each pipeline or their capacity for processing may be determined based at least in part on the available computational, networking or storage resources and the utilization of the resources. For example, if computing resources are heavily utilized, the pipeline assignment and resource allocation entity 318 may bound the number of pipelines or may only task a small number of pipelines with computational-intensive execution stages.

The execution stages of each pipeline may be selected and configured to meet the processing requirements of the data in the data array. In addition, the pipeline assignment and resource allocation entity 318 may determine the size or length of data to be submitted to each execution pipeline for processing or may place a bound on the size or length of data to be submitted to each execution pipeline for processing. The size of the data to be submitted to each execution pipeline for processing may be proportional to the resources that may be dedicated to the execution pipeline.

The pipeline assignment and resource allocation entity 318 then sends 406 information related to the execution pipelines to the data selection entity 316. The information may include the number of pipelines for data execution, the execution stages of each pipe and the size of the data to be provided to each pipeline for execution. The data selection entity 316 may select data from the data array 314 in accordance with the received information and provide the data to the execution pipelines for processing. A set of data is provided to an execution pipeline on a condition that the execution pipeline is configured with the required execution stages for processing the data.

The pipeline assignment and resource allocation entity 318 then allocates 408 computing resources to each stage of the execution pipeline and the execution stages of each pipeline may process the data provided by the data selection entity 316. During or after the data processing, the pipeline assignment and resource allocation entity 318 monitors 410 data processing in the execution stages and system resource utilization. Monitoring data processing may include monitoring the progress of execution in each of the execution stages of the pipelines, monitoring computing resource utilization, network utilization, latency experienced in processing data at the execution stages and the buffer or queue length for the input data to the execution stages.

Based at least in part on monitored resource utilization, the pipeline assignment and resource allocation entity 318 then determines 412 whether to reallocate resources to other pipelines or other execution stages to optimize processing. To determine whether to reallocate resources, the pipeline assignment and resource allocation entity 318 may balance the benefits gained in retaining the allocation of computational or resources to one stage of the execution pipeline against the benefits that may be gained if the resources are allocated to another execution stage or elsewhere in the system. When resources are allocated gains may be achieved in the form of higher throughput, lower latency and faster processing. For example, it may be determined that computing resources may be allocated from encryption, which is a computationally-intensive execution stage, to an input/output stage that is less computationally-intensive and presently deprived of computing resources. The reallocation of resource may result in the reduction of a queue size in the input/output stage and greater data output. The reallocation of resources may come at the expense of a lower output at the encryption stage.

If the pipeline assignment and resource allocation entity 318 determines to reallocate resources to optimize processing, the process 400 proceeds to the allocation of resources to each stage of the execution pipelines. If, on the other hand, the pipeline assignment and resource allocation entity 318 then determines not to reallocate resources, resource allocation is kept 414 unchanged. The process 400 then proceeds to monitoring 410 data processing and resource utilization.

Figure 5:
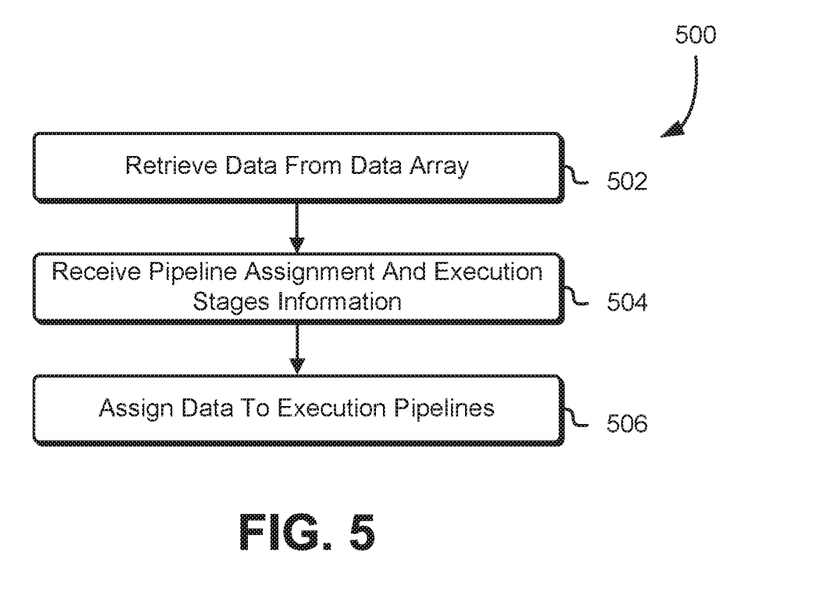
FIG. 5 shows an example of a method for assigning data to staged execution pipelines.

FIG. 5 shows an example of a method for assigning data to staged execution pipelines. In the process 500, a data selection entity, such as data selection entity 316 described with reference to FIG. 3, retrieves 502 data from a data array. The data may be retrieved from the data array in discrete sizes, such as 4 megabytes (MB). The data selection entity 316 then receives 504 pipeline assignment and execution stage information from the pipeline assignment and resource allocation entity 318. As described herein, the pipeline assignment and execution stage information may include information indicating or specifying available or configured pipelines, the execution stages of the pipelines and the size of data to be provided to each of the execution pipelines for processing. The data selection entity 316 then assigns 506 data to the execution pipelines for processing. The assignment of data to the execution pipelines is based at least in part on the processing that is sought to be performed on the data and the type of execution stages configured for each pipeline. For example, checksumming may be performed on data that is sought to be uploaded to a network storage followed by compression and encryption. Data that is retrieved from the data array may be provided to an execution pipeline that has three execution stages, whereby the first execution stage is configured to perform a checksum operation, a second execution is configured to perform compression and a third execution stage is configured to perform encryption. Conversely, if data that is retrieved from the data array is received from network storage, the order of operations performed on the data may be required to be reversed and the data may be provided to a pipeline having execution stages of the reverse order.

Processing and bandwidth resources may be allocated to an execution pipeline or to any stage of the execution pipeline based at least in part on available resources, such as available computational resources (e.g., processing power and CPU thread or core count), local storage capacity, local storage input/output bandwidth, bus bandwidth and network bandwidth. The computational resources may be operations that a processor is capable of performing, such as addition, subtraction, multiplication or moving bits of data between registers. CPU thread count may be the number of parallel threads that an underlying CPU can use to execute instructions. Highly parallel CPUs may have a large number of thread counts, whereby the CPU may use each thread to perform computation and data manipulation operations. CPU core count refers to the number of processing cores a CPU may have, whereby each core may be configured to execute instructions in parallel with another core and each core may be equipped with at least one of a local cache, a load and store unit, an arithmetic and logic unit and the like. A CPU core may have multiple threads, whereby an operation performed by the CPU core may be broken down and jointly executed by two or more threads. Local storage capacity may refer to the volume of data that may be stored in one or more of a processor's caches, RAM, hard disks or hard drives. Further, the input and output bandwidth of local storage may be a rate at which data may be written to or read from local storage and may be measured, for example, in bits or bytes per second. Bus bandwidth may refer to the amount of data that may be carried in an underlying computer system's bus per unit time. Examples of a computer system's bus include a memory bus that connects a processor to memory, among others. The network bandwidth may be the size of data that may be uploaded to or downloaded between a computer system and a network per unit time, as measured, for example, in bits or bytes per second.

As described herein, processing and bandwidth resources may be allocated to any execution pipeline or to any stage of the execution pipeline based at least in part on measurements of utilized resources, such as utilized computational resources, CPU utilization, local storage utilization, local storage input/output consumption or network bandwidth utilization. The computational resources may be operations that a processor is capable of performing, such as addition, subtraction, multiplication or moving bits of data between registers. The utilized computing resource may be the portion or percentage of the used computing resources to the total amount of available or present computing resources.

Figure 6:
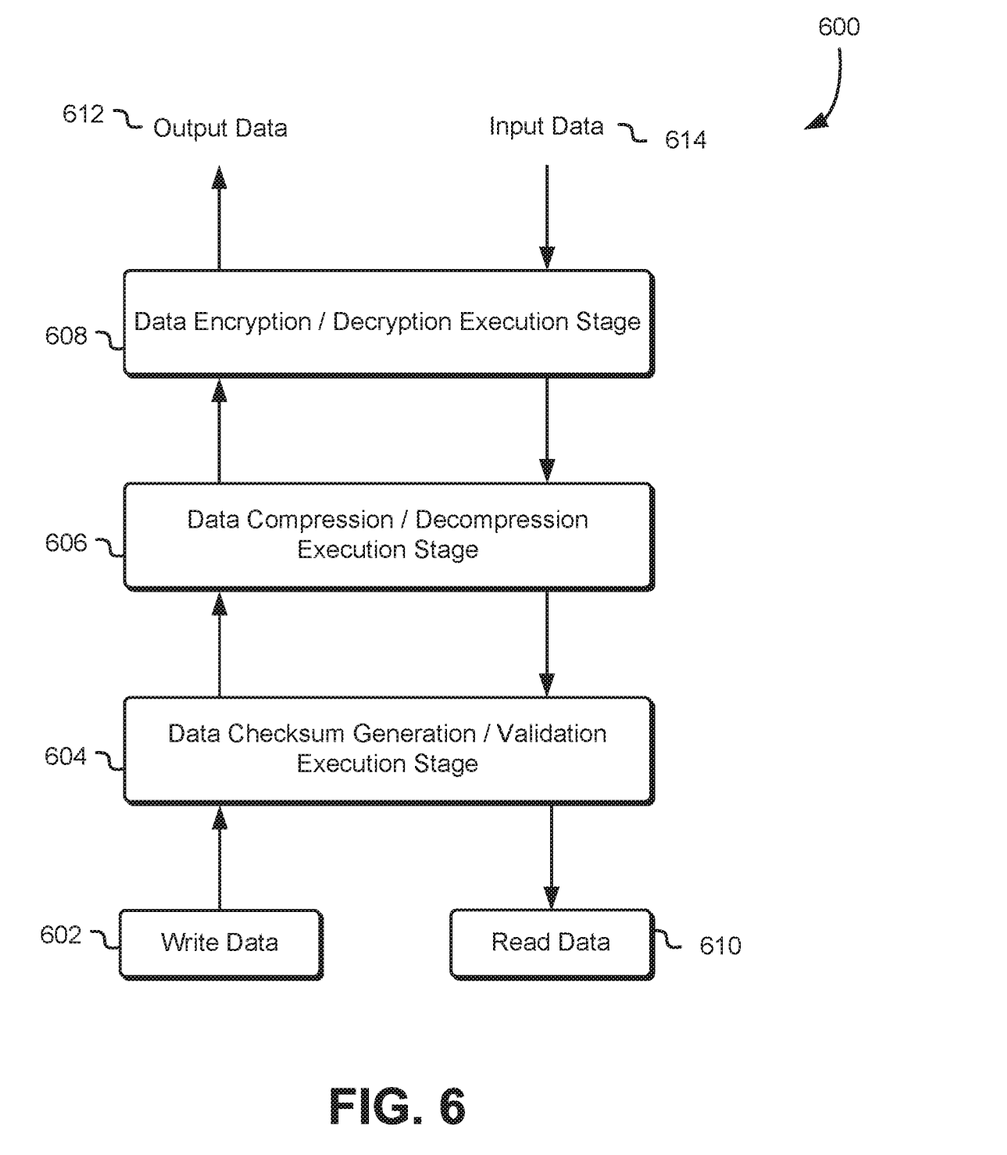
FIG. 6 shows an example of data processing in a staged execution pipeline.

FIG. 6 shows an example of data processing in a staged execution pipeline. The staged execution pipeline receives and processes write data 602 that is to be written to network storage and operates upon the data. After the write data 602 is operated upon in the staged execution pipeline, the write data 602 is provided as output data 612 for storage in network storage. Similarly, the staged execution pipeline receives input data 614 from network storage and processes and operates upon the input data 614. After the input data 614 is operated upon, the input data 614 is ready to be read and is provided for use as read data 610.

The staged execution pipeline includes a data checksum generation/validation execution stage 604, a data compression/decompression execution stage 606 and a data encryption/decryption execution stage 608. The data checksum generation portion of the data checksum generation/validation execution stage 604 is used to generate a checksum on write data 602 that is entering the staged execution pipeline while the data checksum validation portion of the data checksum generation/validation execution stage 604 to validate a checksum of input data 614. It is noted that although the staged execution pipeline shown in FIG. 6 is configured to operate on both write data 602 to be provided to network storage and input data 614 received from network storage and provided as read data 610, the staged execution pipeline may be decoupled in alternative embodiments into two independent pipeline, whereby a first pipeline is established to operate on upload data and another pipeline is established to operate on download data.

After a checksum is generated for the write data 602 by the data checksum generation/validation execution stage 604, an output is provided to the data compression/decompression execution stage 606. The data compression/decompression execution stage 606 performs compression on the received data to enable efficient transmission to network storage. The compressed data is then provided to the data encryption/decryption execution stage 608, whereby the data is compressed and provided as output data 612.

For data that is read from network storage, the order of execution is reversed. Input data 614 is received and decrypted in the data encryption/decryption execution stage 608 to provide an output to the data compression/decompression execution stage 606. The data compression/decompression execution stage 606 performs decompression on the output of the data encryption/decryption execution stage 608 and provides a second output to the data checksum generation/validation execution stage 604. The data checksum generation/validation execution stage 604 performs checksum validation on the second input and, in turn, outputs read data 610 for use.

A pipeline may be prioritized for processing and execution over another pipeline. Prioritizing the pipeline may include allocating more computing resources to the execution stages of the pipeline than another pipeline. The prioritization of the pipeline may be based at least in part on the type of data processed at the execution stages of the pipeline or the type of processing or tasks executed by one or more execution stages of the pipeline. For example, two types of data may be retrieved from network storage; pre-fetch data and user-requested data. Pre-fetch data may be read in anticipation of the user requesting the data and may be locally cached in order to be readily available for the user if requested. A pipeline processing user-requested data may be given priority over a pipeline processing pre-fetch data as the user may be awaiting the requested data, whereas the pre-fetch data is based on a prediction of the data that may be required by the user in the future. When a user issues a request for data, a pipeline may be established for processing the requested data. If there are existing resources allocated to a pre-fetch data pipeline, the resources may be reallocated to the pipeline servicing user-requested data.

Figure 7:
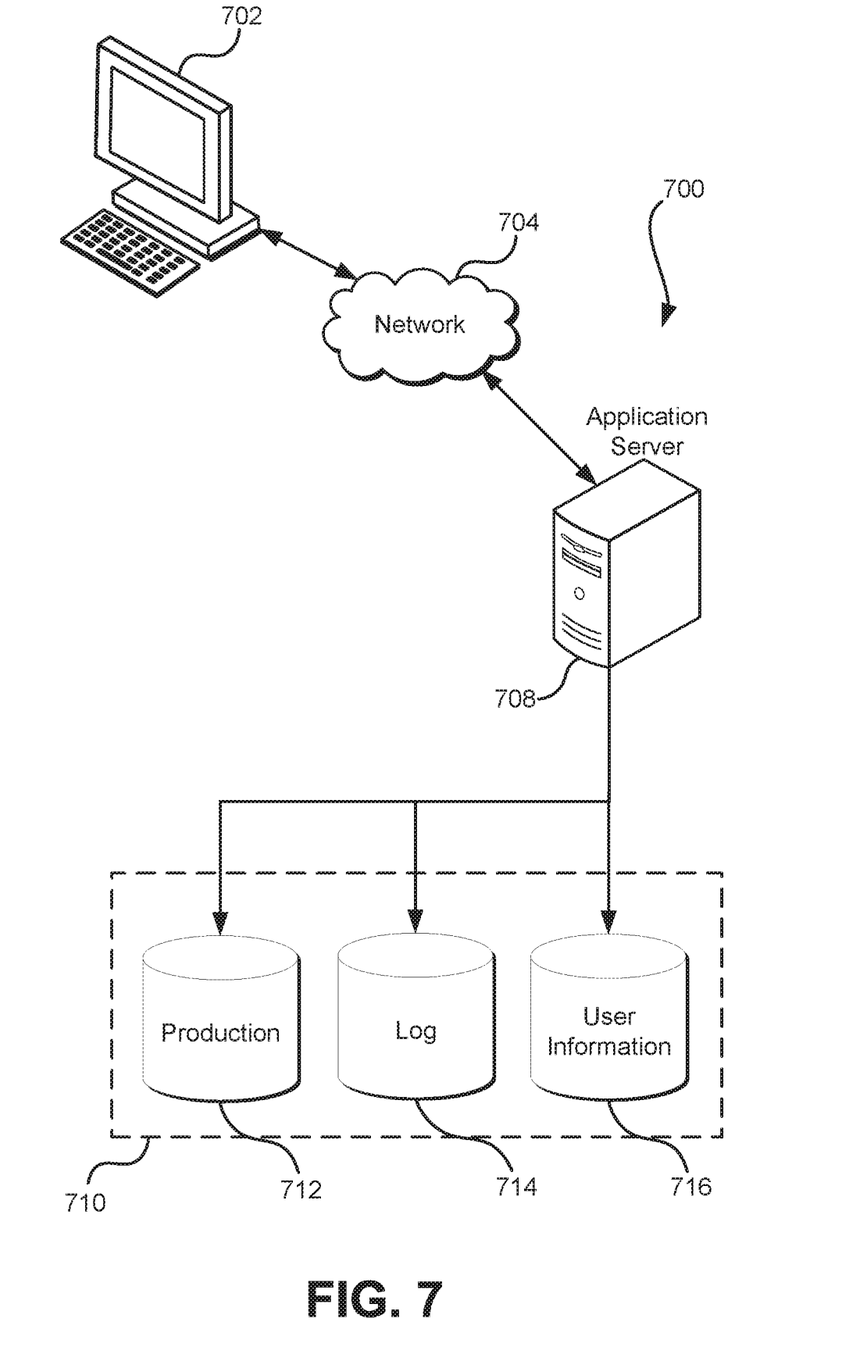
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. The network may include the Internet and the environment may include a web server for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by a web server in the form of HyperText Markup Language ("HTML"), Extensible Markup Language ("XML") or another appropriate structured language in this example. The handling of all requests and responses, as well as the delivery of content between the client device 702 and the application server 708, can be handled by a web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 710 can include several separate data tables, databases or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
receiving a plurality of data processing requests, each data processing request of the plurality being associated with data requested to be stored on a data storage system connected to the one or more computer systems, at least some of the data being associated with a user device connected to the one or more computer systems;
processing the plurality of data processing requests and information associated with computing resources of the one or more computer systems to establish execution pipelines for executing the plurality of data processing request;
establishing the execution pipelines by allocating a subset of the computing resources to one or more execution stages of each of the number of execution pipelines, the one or more execution stages each corresponding to at least one processing type requested by at least a subset of the plurality of data processing requests;
providing the data to the execution pipelines for execution of the plurality of data processing requests according to an associated processing type of each of the plurality of data processing requests;
monitoring execution of the data processing requests in the execution pipelines; and
providing one or more outcomes of the execution of the processing requests to the user device as a result of the monitoring.

2. The computer-implemented method of claim 1, wherein the user device is remote from the data storage system, and interfaces with the one or more computer system to store the data on the data storage system.

3. The computer-implemented method of claim 1, wherein allocating the subset of the computing resources to the one or more execution stages of the one or more pipelines is based at least in part on one or more properties of the computing resources.

4. The computer-implemented method of claim 3, wherein the one or more properties include at least one of bandwidth, CPU thread or core count, local storage capacity or local storage input/output bandwidth.

5. The computer-implemented method of claim 1, wherein the data is queued in a first in, first out (FIFO) queue before being provided to the execution pipelines.

6. The computer-implemented method of claim 1, further comprising sending the data to the data storage system for storage after execution of the associated data processing requests is complete.

7. A system, comprising:
at least one computing device implementing one or more services to:
queue a plurality of data processing requests associated with data to be stored on a data storage system;
determine, based at least in part on one or more properties of the plurality of data processing requests and configuration of resources associated with the at least one computing device, a configuration of a plurality of execution pipelines to process the plurality of data processing requests, the one or more properties including at least a type of operation to be performed;
generate the plurality of execution pipelines according to the configuration as determined by at least allocating a subset of the resources to one or more execution stages of each execution pipeline based at least in part on one or more properties of the resources;
execute at least a subset of the data processing requests using at least a subset of the plurality of execution pipelines such that the data processing requests are aligned with the configuration of the plurality of execution pipelines; and
monitor the execution of the subset of the data processing requests so as to provide information regarding the execution to a requestor.

8. The system of claim 7, wherein the at least one computing device implements the one or more services to retrieve, prior to execution of the subset of the data processing requests, subsets of the data such that each of the subset of the data has a size conforming to the configuration of the plurality of execution pipelines, the data size being determined by based at least in part on a configuration of the resources allocated to the execution pipelines.

9. The system of claim 7, wherein the at least one computing device implements the one or more services to obtain the data from a user device connected to the one or more services in connection with the data processing requests, and buffer the data prior to execution of the subset of the data processing requests.

10. The system of claim 7, further comprising a network interface that receives data from the execution pipelines after execution of the associated data processing requests and submits the data, after execution, over a network to a data storage system.

11. The system of claim 7, wherein the resources to which the execution pipelines have access include computational resources or input/output resources.

12. The system of claim 7, wherein:
a quantity of the generated pipelines is proportional to at least one of network bandwidth, CPU thread or core count, local storage capacity or local storage input/output bandwidth; and
the quantity of pipelines is bound by a maximum quantity of pipelines.

13. One or more non-transitory computer-readable storage media having collectively stored thereon instructions that, as a result of execution by one or more processors of a computer system, cause the computer system to:
process a plurality of data processing requests associated with data to be stored on a data storage system by at least allocating a first data processing request of the plurality of data processing requests to a first execution pipeline for execution and a second data processing request of the plurality of data processing requests to a second execution pipeline for execution, the first data processing request having a higher execution priority than the second data processing request based at least in part on the first data processing request being associated with a different type of operation than that of the second data processing request;
monitor operation of at least the first execution pipeline and the second execution pipeline so as to detect utilization of one or more computing resources of the computer system as allocated to the first execution pipeline and the second execution pipeline; and
if detected that the first pipeline requires additional computing resources, at least:
deallocate at least one computing resource from an execution stage of one or more execution stages of the second pipeline based at least in part on the first data processing request having the higher execution priority; and
reallocate the at least one computing resource to the first pipeline.

14. The one or more non-transitory computer-readable storage media of claim 13, wherein reallocating the computing resource is based at least in part on fulfillment of a condition on processing latency of the first pipeline.

15. The one or more non-transitory computer-readable storage media of claim 13, wherein the detected utilization includes utilization associated with at least one of network bandwidth, CPU thread, local storage capacity or local storage input/output bandwidth.

16. The one or more non-transitory computer-readable storage media of claim 13, wherein the data is queued before being provided to the first execution pipeline and to the second execution pipeline for execution.

17. The one or more non-transitory computer-readable storage media of claim 16, wherein the data provided to the first pipeline is processed at each execution stage of one or more execution stages of the first execution pipeline and the data provided to the second pipeline is processed at each execution stage of one or more execution stages of the second execution pipeline.

18. The one or more non-transitory computer-readable storage media of claim 13, wherein the instructions, when executed by the one or more processors of the computer system, cause the computer system to further transmit, after processing of the data processing requests, the data as processed to a data storage system for storage.

19. The one or more non-transitory computer-readable storage media of claim 13, wherein the higher execution priority of the second data processing request is associated with a requestor of the second data processing request.

20. The one or more non-transitory computer-readable storage media of claim 13, wherein the one or more execution stages each correspond to at least one processing type associated with at least a subset of the plurality of data processing requests.

\* \* \* \* \*

UNITED STATES PATENT AND TRADEMARK OFFICE
CERTIFICATE OF CORRECTION

PATENT NO. : 9,916,099 B2
APPLICATION NO. : 15/161117
DATED : March 13, 2018
INVENTOR(S) : Nishanth Alapati et al.

It is certified that error appears in the above-identified patent and that said Letters Patent is hereby corrected as shown below:

In the Specification

Column 7, Line number 67:
"314 include a or first in,"

Should read as:
--314 include a first in,--

Signed and Sealed this
Second Day of June, 2020

Andrei Iancu
*Director of the United States Patent and Trademark Office*